United States Patent [19]
Knoblauch et al.

[11] Patent Number: 5,089,048
[45] Date of Patent: Feb. 18, 1992

[54] PROCESS FOR HELIUM ENRICHMENT

[75] Inventors: Karl Knoblauch, Essen; Erwin Pilarczyk, Bottrop; Klaus Giessler, Gelsenkirchen; Hans Bukowski, Essen, all of Fed. Rep. of Germany; Joseph S. D'Amico, Baltimore; Herbert Reinhold, Annapolis, both of Md.

[73] Assignee: Bergwerksverband GmbH, Essen, Fed. Rep. of Germany

[21] Appl. No.: 445,716

[22] PCT Filed: May 19, 1988

[86] PCT No.: PCT/EP88/00441
§ 371 Date: Nov. 17, 1989
§ 102(e) Date: Nov. 17, 1989

[87] PCT Pub. No.: WO89/10810
PCT Pub. Date: Nov. 16, 1989

[30] Foreign Application Priority Data
May 20, 1987 [DE] Fed. Rep. of Germany ....... 3716898

[51] Int. Cl.⁵ .............................................. B01D 53/04
[52] U.S. Cl. .................................... 55/25; 55/26; 55/58; 55/62; 55/68; 55/75
[58] Field of Search ............... 55/25, 26, 58, 62, 66, 55/68, 74, 75

[56] References Cited
U.S. PATENT DOCUMENTS

| | | | |
|---|---|---|---|
| 3,430,418 | 3/1969 | Wagner | 55/62 X |
| 3,564,816 | 2/1971 | Batta | 55/26 |
| 3,636,679 | 1/1972 | Batta | 55/62 X |
| 3,738,087 | 6/1973 | McCombs | 55/58 |
| 3,866,428 | 2/1975 | Simonet et al. | 62/18 |
| 3,923,477 | 12/1975 | Armond et al. | 55/58 X |
| 4,077,779 | 3/1978 | Sircar et al. | 55/25 |
| 4,444,572 | 4/1984 | Avon et al. | 55/26 |
| 4,790,858 | 12/1988 | Sircar | 55/58 X |
| 4,892,565 | 1/1990 | Schmidt et al. | 55/62 X |
| 4,913,709 | 4/1990 | Kumar | 55/26 |
| 4,914,218 | 4/1990 | Kumar et al. | 55/26 |

FOREIGN PATENT DOCUMENTS

| | | |
|---|---|---|
| 0071553 | 2/1983 | European Pat. Off. . |
| 0092695 | 11/1983 | European Pat. Off. . |
| 0112640 | 7/1984 | European Pat. Off. . |
| 3132758 | 3/1983 | Fed. Rep. of Germany . |

OTHER PUBLICATIONS

Bulletin 675 Helium—1985 U.S. Department of Interior A Chapter from Mineral Facts and Problems—Bureau of Mines.
Chemical Abstracts vol. 92, No. 14—Apr. 1980, Columbus, Ohio p. 127.
Adsorption, vol. 2, 1972, pp. 611–612 (no translation).

Primary Examiner—Robert Spitzer
Attorney, Agent, or Firm—Herbert Dubno

[57] ABSTRACT

A method is provided for extracting helium from a relatively helium poor gas mixture through a pressure swing adsorption process which adhieves an enriched product gas containing over 50% helium. The gas mixture to be enriched is fed cyclically to four adsorber vessels ranged in parallel which successively pass through a pressure build-up, an adsorptive and a pressure relief phase, with pressure build-up and relief being in part brought about by pressure compensation with any one of the other adsorbers. The pressure-build up and relief phases include a series of three and four, respectively, steps involving alternating pressure levels. As a preliminary treatment, the process may include an initial step wherein the unenriched gas mixture is first fed through a series of pre-filters filled with activated carbon for removing higher hydrocarbons.

13 Claims, 5 Drawing Sheets

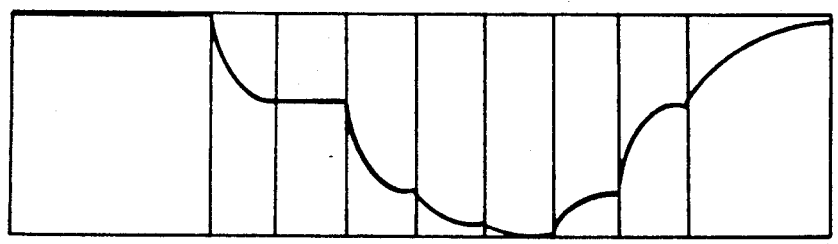
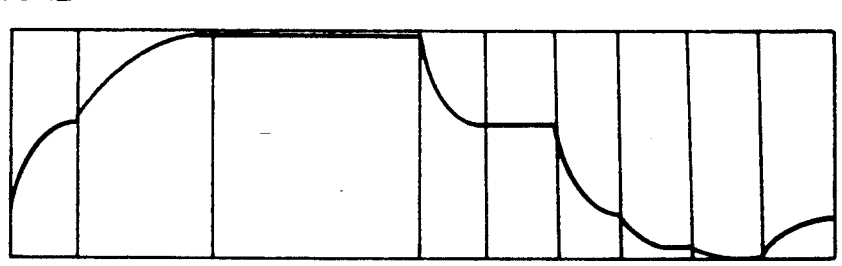
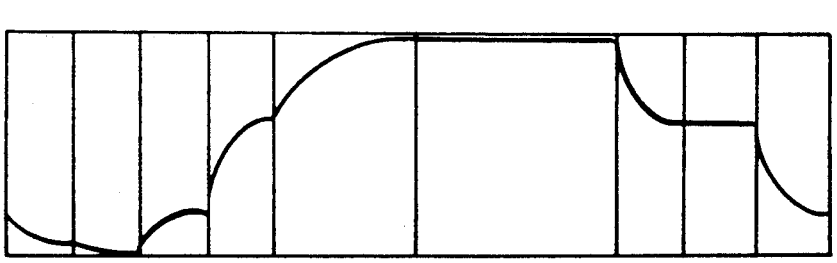
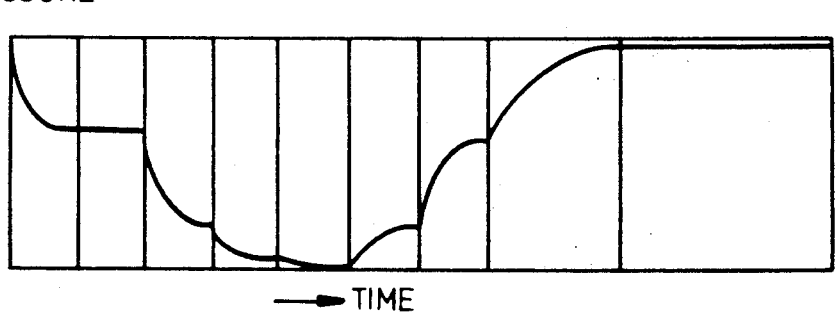
FIG.3

FIG.4

PROCESS FOR HELIUM ENRICHMENT

CROSS REFERENCE TO RELATED APPLICATIONS

This application is a National Phase application of PCT/EP 88/00441 filed 19 May 1988 and based upon German application P 37 16 898.3 filed 20 May 1987 under the International Convention.

FIELD OF THE INVENTION

The invention relates to a method of helium enrichment according to a pressure swing adsorption process, from gas mixtures containing helium, nitrogen, methane and other gases passed through carbon molecular sieves which adsorb nitrogen and methane and the mentioned other gases, wherein the gas mixture is fed cyclically to four adsorber vessels arranged in parallel, which successively pass through a pressure build-up, an adsorptive and a pressure-relief phase, with pressure build-up and relief taking place in part through pressure compensation with any one of the other adsorbers.

BACKGROUND OF THE INVENTION

A pressure swing adsorption process as hereinabove described is known from European patent specification 0 092 695 for the purification of helium, wherein starting with a mixture containing helium and consisting essentially of nitrogen, argon and oxygen, as well as smaller fractions of carbon dioxide and methane, and using molecular sieves, helium with a purity of over 99.9% by volume can be obtained. However, the initial mixture in this process already has a content of 50-95% by volume of helium. This process is not suitable for gas mixtures containing only up to 10% helium, since the process cycle and the combination of process steps are not suitable.

From U.S. Pat. No. 3,636,679 a further pressure swing adsorption process for helium enrichment is known, wherein the gas mixture is cyclically fed to 4 adsorbers, each of them passing successively through a pressure build-up phase, an adsorption phase and a pressure relief phase, whereby the pressure build-up and the pressure relief are partially performed through pressure compensation with two different adsorbers, the pressure build-up phase having three steps, and the pressure relief phase having four steps. However, in this case, besides the pressure relief steps an additional flushing step is required for a complete regeneration. The product gas yield (according to Example 53%) is therefore comparatively low. Furthermore, it is disadvantageous that the product gas recovery takes place at low process pressure (during the pressure relief steps), so that the product gas has to be brought to a higher pressure level for many purposes of use. Moreover, the various pressure levels, at which the product is obtained, require a pressure compensation, which again can lead to oscillations in the amount of product gas.

Helium is increasingly in demand for several applications, e.g. refrigeration plants for refrigeration, as a shielding gas during welding and in the chemical industry, as inert gas in space technology, as a respiration gas during diving, as a carrier gas in chromatography, for the detection of leakages, as a balloon-filling gas and for other purposes as well. For these purposes, helium is required with a high degree of purity. In order to achieve this high purity level, in gas mixtures containing only low levels of helium, several process steps are required, in order to first enrich the gas mixture with helium and then to recover high purity helium from this helium-enriched gas mixture.

Helium is enriched and recovered mainly from helium-containing natural gases. The main components of these gases are nitrogen and methane, as well as up to 10% by vol. helium, besides lower proportions of several higher-molecular weight hydrocarbons and carbon dioxide.

According to the state of the art, the following method of helium enrichment is known, as has been published in "Bureau of Mines, Preprint from Bulletin 675—Helium—1985 Edition, U.S. Department of Interior", pages 3 and 4.

The helium-containing natural gas is cooled down to approx. $-150°$ in a cryogenation plant, whereby primarily the hydrocarbons will be released by condensation. The so-produced gas mixture, except for low proportions of other gases contains more than 50% by vol. helium and nitrogen. Such crude helium can be treated on the spot to give a helium of very high purity, e.g. by subjecting it to some process combination comprising a pressure swing adsorption plant plus a second cryogenation unit.

Another alternative is to sell the crude helium as an intermediate product to be treated by some third party.

SUMMARY OF THE INVENTION

It is therefore the object of the present invention to perform helium enrichment from natural gases low in helium, subjecting them to pressure swing adsorption only, to give a high yield in crude helium of a purity possibly over 50%, without the need of intermediate enrichment in cryogenation plants.

These requirements are met by a process of the above-mentioned type and namely through the following procedure involving:

a/ A pressure build-up phase which comprises three steps:
1. Pressure increase from a final vacuum pressure ($P_1$) to a medium pressure level ($P_3$);
2. Pressure increase from the medium pressure level ($P_3$) to a higher pressure level ($P_4$);
3. Pressure increase from the higher pressure level ($P_4$) to the highest pressure level ($P_5$)—adsorption pressure;

b/ A pressure relief phase which comprises four steps:
1. Pressure relief from the highest pressure level ($P_5$) down to the higher pressure level ($P_4$);
2. Pressure relief from the higher pressure level ($P_4$) down to the medium pressure level ($P_3$);
3. Pressure relief from the medium pressure level ($P_3$) down to the ambient pressure ($P_2$);
4. Pressure relief from the ambient pressure ($P_2$) down to the final vacuum pressure ($P_1$);

c/ Pressure compensation brought about in two steps with the first compensation step taking place between the outlet of a first adsorber where the first pressure relief step (from $P_5$ down to $P_4$) occurs and an outlet of a second adsorber where the second pressure build-up step (from $P_3$ up to $P_4$) occurs, and with the second compensation step taking place between an outlet of the first adsorber where the second pressure relief step (from $P_4$ down to $P_3$) occurs and an inlet of a third adsorber where the first pressure build-up step (from $P_1$ up to $P_3$) occurs; and d/ A third as well as a fourth pressure relief step are effected by counterflow, whereby a waste gas low in helium is obtained and the third pressure increase step is effected with product gas.

As adsorbents for the process of the invention, carbon molecular sieves are used, with an average adsorptive pore diameter between 0.1 and 0.4 nm, preferably between 0.3 and 0.4 nm. These sieves are extremely effective in separating nitrogen and methane from helium. Surprisingly already after one single step, a helium of comparably high purity (over 50%) with a high helium yield of more than 90% is obtained when proceeding according to the suggested teaching. This will be attainable with initial gas mixtures of comparably low helium concentrations between approx. 8 and 2%, exclusively by the application of pressure swing technology which no longer requires any cryogenation plant, i.e. with very low energy consumption.

It is advisable to provide adsorptive prefilters filled with activated carbon, in order to release higher-molecular hydrocarbons and trace contamination.

Tests have shown that the highest pressure level ($P_5$), i.e. adsorption pressure, should be over 1 bar, preferably 10-30 bar, and the final vacuum pressure below 500 mbar, preferably 50 mbar.

According to a preferred embodiment, to the individual pressure steps the following preferential pressure levels are associated:

$P_1 = 50$ mbar
$P_2 = 1$ bar
$P_3 = 4$ bar
$P_4 = 11.7$ bar
$P_5 = 20$ bar

The entire operational cycle lasts between 460 and 3600 s., preferably 720 s.

According to a preferred embodiment, in an operational cycle lasting 720 s, the pressure relief phase can comprise the following time intervals:

| | |
|---|---|
| 1. Pressure relief step from $P_5$ down to $P_4$ | 55 s |
| Rest position | 115 s |
| 2. Pressure relief step from $P_4$ down to $P_3$ | 10 s |
| 3. Pressure relief step from $P_3$ down to $P_2$ | 55 s |
| 4. Pressure relief step from $P_2$ down to $P_1$ | 115 s |

Also according to a preferred embodiment, the pressure build-up phase of the operational cycle lasting 720 s is suitably subdivided into the following time intervals:

| | |
|---|---|
| 1. Pressure build-up step from $P_1$ to $P_3$ | 10 s |
| 2. Pressure build-up step from $P_3$ to $P_4$ | 55 s |
| 3. Pressure build-up step from $P_4$ to $P_5$ | 125 s |

In an operational cycle lasting 720 s it is advisable to select as a time interval from the product gas recovery 180 s.

The process of the invention is particularly suitable for the enrichment of helium from feed gases whose helium content is of 10% by vol. or lower, preferably 2-8% by volume, whereby the helium content in the recovered crude helium is of up to 95% by volume.

The process of the present invention is preferred in the helium enrichment from natural gases, which after a prior separation from higher-molecular hydrocarbons and trace contaminations, in adsorptive prefilters known per se, can have the following composition (given in % by volume):

| | |
|---|---|
| $N_2$ | 40-80 |
| He | 2-8 |
| $CH_4$ | 10-40 |
| $CO_2$ | <0,1-5 |

BRIEF DESCRIPTION OF THE DRAWING

Further advantages and embodiments can be taken from the description of practical examples given hereafter in connection with the enclosed drawings where:

FIG. 3 is a pressure/time diagram and table of process increments achieved through operation of the four plant adsorbers according to FIG. 1;

FIG. 4 is a valve circuit diagram for the four plant adsorbers the helium purity in a plant according to FIG. 1.

DETAILED DESCRIPTION

Figure 1:
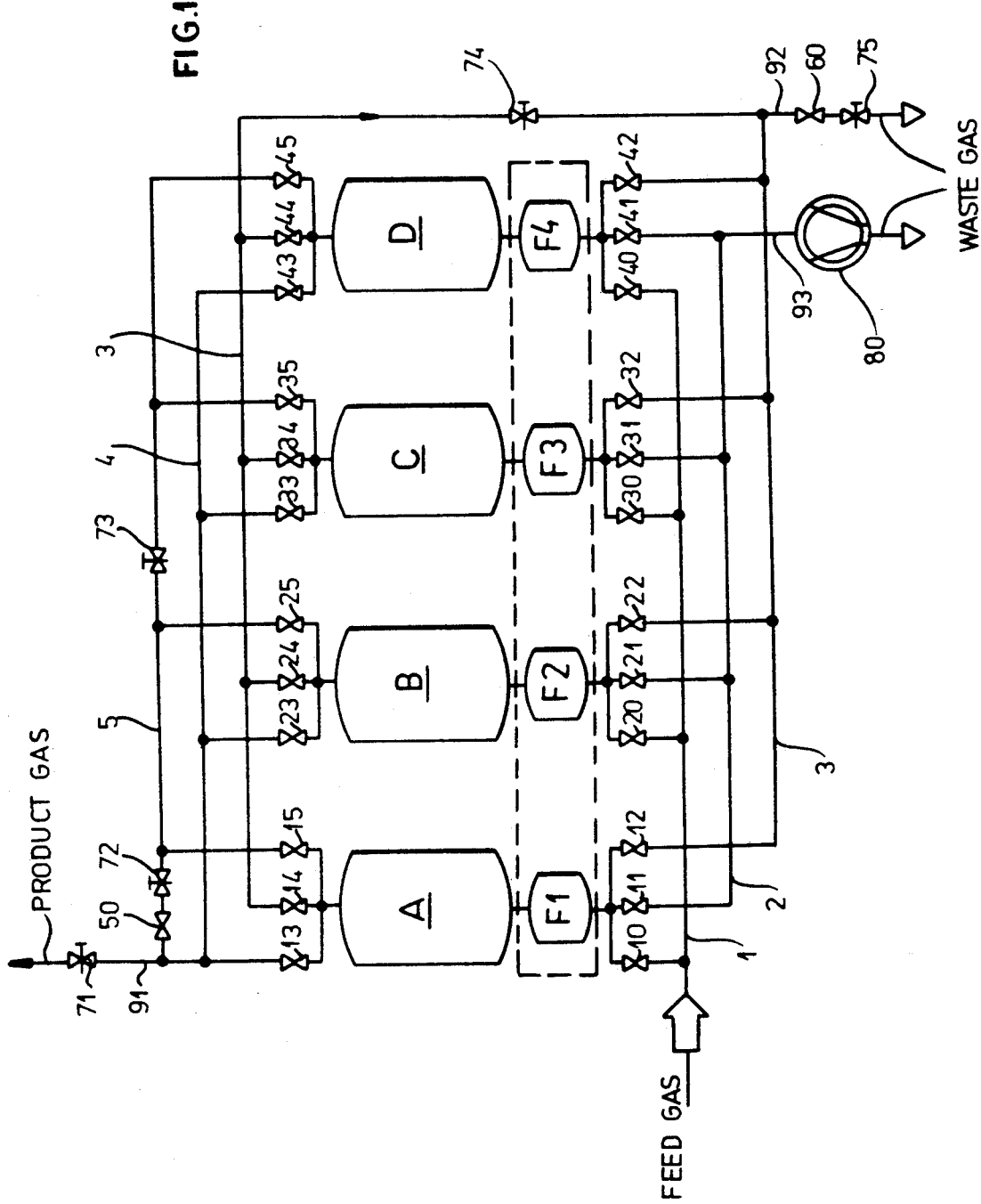
FIG. 1 is a single-step helium recovery unit including four adsorbers arranged in parallel, for helium enrichment up to 95% by vol. purity.

The plant as shown in FIG. 1 consists of four adsorbers A through D, arranged in parallel, filled with carbon molecular sieve and, as the case may be, of four prefilters F 1 through F 4 filled with activated carbon and where, if need be, any higher-molecular hydrocarbons and trace contaminents can be removed from the feed gas prior to its entering the adsorbers A through D. Each adsorber passes the following eight steps in successive cycles and in a staggered time pattern in relation to the remaining three adsorbers:

T1—Adsorption
T2—Pressure relief by compensation (Da 1)
T3—Pressure relief by compensation (Da 2)
T4—Counter-flow pressure relief (GEE)
T5—Evacuation (Ev)
T6—Pressure build-up by compensation (DA 1)
T7—Pressure build-up by compensation (DA 2)
T8—Pressure build-up using product gas (DA 3)

Figure 2:
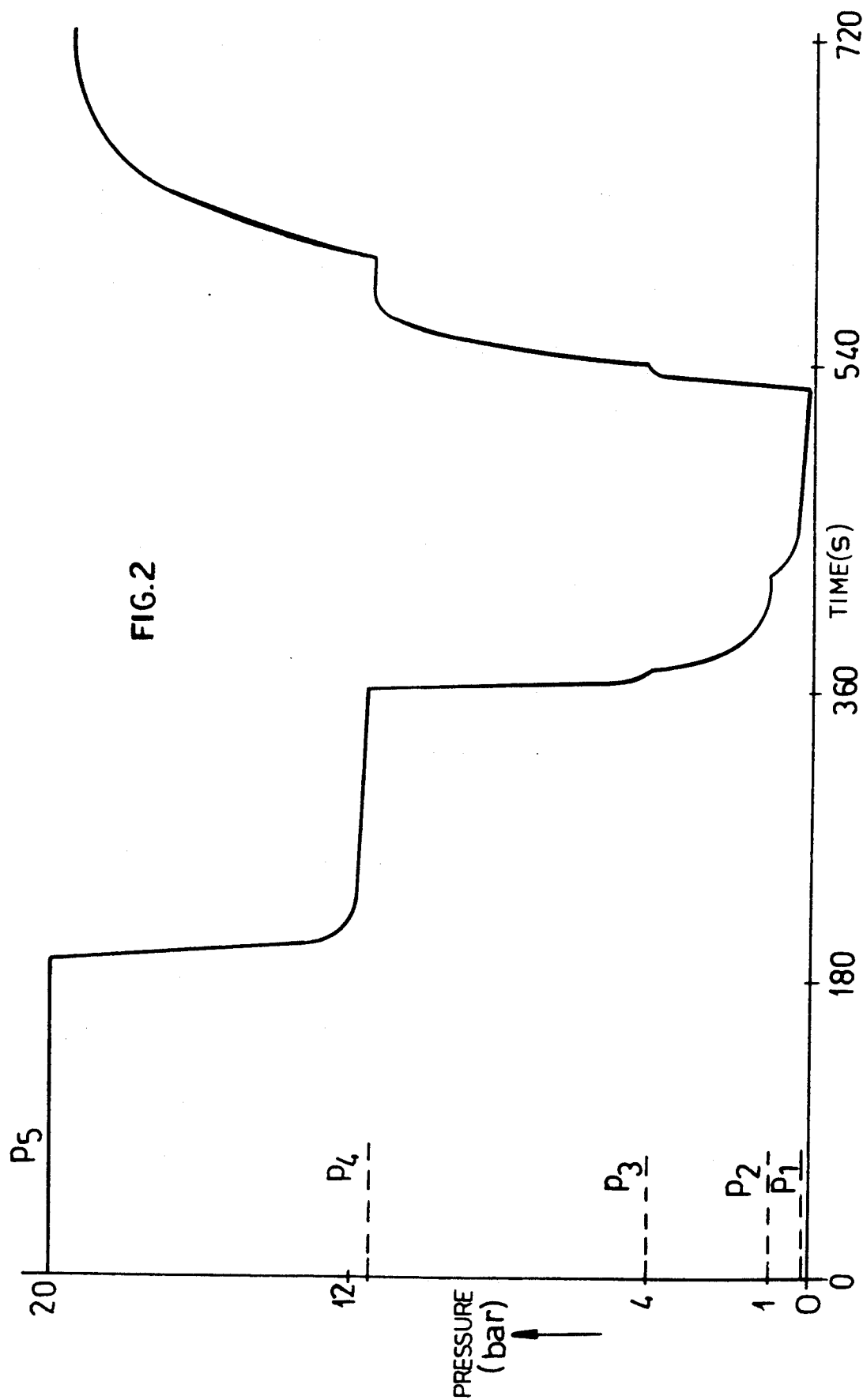
FIG. 2 is a pressure/time diagram of an adsorber within the plant, according to FIG. 1.

Before dealing with the details of FIG. 1, we shall first describe the sequence of the eight incremental steps T1 through T8 set forth on the pressure/time profiles represented in FIGS. 2 and 3.

FIG. 2 shows the typical pressure/time profile for 20 bar adsorption pressure and 720 s overall cycle duration. The profile applies to each of the four adsorbers, with a given staggering in time. On the pressure axis have been plotted the five pressure levels from P1 through P5 between which in our case will take place the pressure build-up, viz. relief steps.

FIG. 3 shows the pressure/time profiles, staggered in time, within the four adsorbers A through D. Hereafter will be described the typical operational cycles going on in adsorber A; identical cycles will be valid for the remaining three adsorbers B, C and D.

Adsorption (step T1) takes place at a constant, increased pressure level, e.g. at 20 bar. At such pressure adsorber A is traversed by the feed gas during which action nitrogen, methane and other gas componants are adsorbed by the carbon molecular sieve so that helium which resists to adsorption leaves the adsorber with a high degree of purity.

After an adsorption cycle the loaded adsorber A is subjected to several pressure relief steps (T2 through T5) for regeneration.

Such regeneration starts by a first pressure compensation Da 1 (step T2) during which the gas, being at adsorptive pressure, passes in a parallel flow from adsorber A to adsorber C to be brought down from pressure level $P_5$ to the lower level of $P_3$. The passage of the gas from adsorber A (T2) to adsorber C(T7) has been identified by an arrow in the sequence of process steps as per FIG. 3.

During the first pressure compensation step (Da 1) the pressure in adsorber A is relieved to pressure level $P_4$ (which may be 11.7 bar whereas the pressure prevailing in adsorber C increases simultaneously from level $P_3$ to level $P_4$ (pressure build-up DA 2).

After a short rest position (standby), a second pressure compensation (DA 2, step T3) takes place in adsorber A when the gas, being at pressure level $P_4$, leaves adsorber A (again in a parallel flow) to be passed for pressure relief to the adsorber D which is at vacuum pressure $P_1$. All the while the pressure $P_4$ prevailing in adsorber A drops to level $P_3$ which may be 4 bar. During both of the pressure compensation steps a helium-enriched gas mixture will flow from adsorber A to adsorber C, viz. to adsorber D.

Following the two pressure compensation steps (Da 1 and Da 2) adsorber A will, by counter-flow, continue to be relieved, this time from level $P_3$ to ambient pressure $P_2$ (GEE, step T4). All the while a gas mixture low in helium is yielded which is rather high in nitrogen and methane and other components having been desorbed during counter-flow relief (GEE); this gas mixture is discarded.

Hereafter adsorber A will be evacuated by vacuum pump 80 to a vacuum pressure $P_1$ of e.g. 50 mbar (Ev, step T5). During this procedure nitrogen and methane as well as other gas component having been adsorbed during the prior step T1 will increasingly become desorbed. The evacuated gas is extremely low in helium and therefore discarded as well.

With the evacuation step, regeneration of adsorber A is completed where now the pressure will gradually be built up by steps T6 through T8 until having arrived at adsorption pressure $P_5$.

The first pressure compensation (step T6) takes place between adsorber A will, by counter-flow, continue to be relieved, T2 and is—evacuation of adsorber A nearing completion—at a higher intermediate pressure $P_4$. During pressure compensation, a helium-enriched gas mixture flows from adsorber B to adsorber A, this mixture being withdrawn from adsorber B preferably in a parallel flow to enter adsorber A likewise in a parallel flow (top/bottom pressure compensation). All the while pressure in adsorber A (build-up DA 1) rises from the final vacuum pressure $P_1$ to an intermediate level $P_3$ which may be at 4 bar, whereas simultaneously the intermediate pressure level $P_4$ prevailing in adsorber B will drop to the lower intermediate level $P_3$.

The following pressure compensation (step T7) with adsorber C help to further increase the pressure in adsorber A (build-up DA 2). Prior to that compensation, adsorber C has passed through step T1 (adsorption) and is on the point of being pressure-compensated with adsorber A which latter is at the adsorption pressure level $P_5$. In the example quoted, pressure compensation is done in such a way that the helium-enriched gas mixture is withdrawn in a parallel flow from adsorber C to be relieved by entering adsorber A in a counter-flow (top/top pressure compensation). All the while the pressure in adsorber A rises from an intermediate level $P_3$ to the nextmost level $P_4$ which may be at 11.5 bar, whereas at the same time the adsorption pressure $P_5$ prevailing in adsorber C drops to the intermediate level $P_4$.

After the aforesaid double pressure compensation, product gas is used to increase the pressure in adsorber A from the higher intermediate level $P_4$ to the adsorption pressure level $P_5$ (e.g. 20 bar) (build-up DA 3, step T8), after which will start another adsorption step in adsorber A (step T1).

Figure 4:
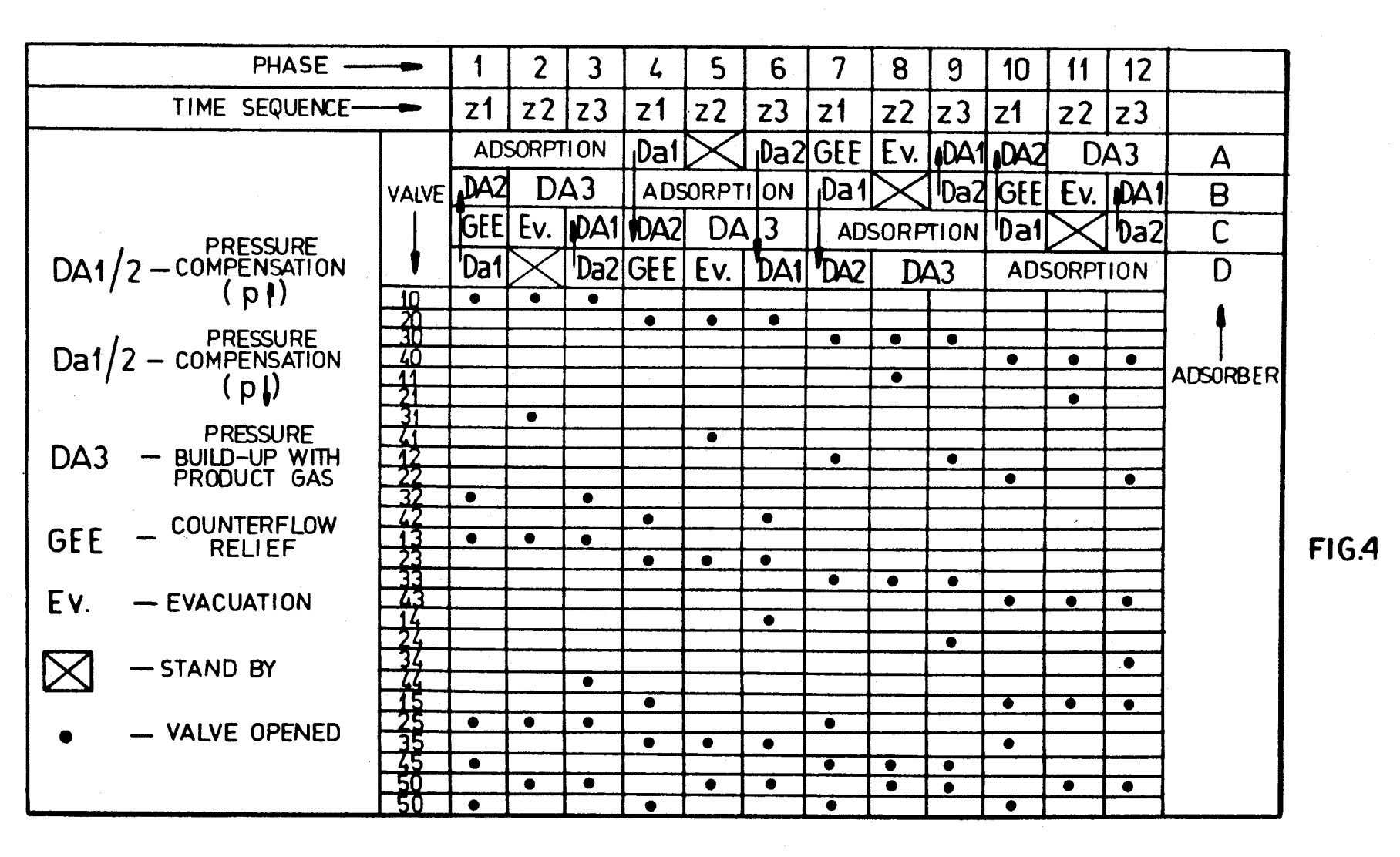

As shown in FIG. 1 the four adsorbers A through D are switched via a number of valves in such a way that one of the four is always at adsorption pressure to produce helium of high purity as product gas. FIG. 4 represents the switching circuit of the valves. The following is to explain, based on FIGS. 4 and 1 and taking adsorber A as an example, the supply and abduction of gases in the pressure swing adsorption plant as represented on FIG. 1. The adsorbers A through D may be preceded by prefilters F1 through F4 which are a technical standard and serve for the preliminary removal of highly adsorbing gas constituents of higher-molecular hydrocarbons from oil well gases. As shown by the example, filter operation normally is similar to that of the filters at the subsequent main adsorbers A through D arranged in series and therefore these further operations are not discussed.

Upon pressure build-up by product gas (DA 3, step T8), adsorber A is at adsorption pressure $P_5$. During subsequent adsorption (step T1) feed gas arrives through line 1 at a pressure which, for overcoming the pressure drop within the plant, is slightly above adsorption pressure, with open valves 10 and 13 arranged in flow direction, upstream, viz. behind adsorber A, and flows through adsorber A. With the exception of helium all the other constituents of the feed gas, such as nitrogen and methane, will be adsorbed thereby on the carbon molecular sieve so that a helium-enriched gas leaves the top of adsorber A via line 4 and needle valve 71 (adjusting valve) to be discharged through a product gas line 91. The adsorption is subdivided in three time steps Z1, Z2 and Z3 matching with the valve circuit diagram on FIG. 4. During step Z1 a valve 50 arranged in line 5 is closed so that all of the product gas enters the product gas line 91 via line 4. During steps Z2 and Z3 valve 50 opens so that part of the product gas enters the adsorber B via a subsequent choke 72, via line 5 and the open valve 25 preceding adsorber B which latter, under the action of the product gas having entered during step T8, is boosted from the intermediate pressure level $P_4$ to adsorption pressure $P_5$. The duration of said time steps Z1, Z2 and Z3 may, with an overall cycle duration of 720 s, amount to 55 s for step Z1, 115 s for step Z2 and 10 s for step Z3.

Adsorber A will, after its adsorptive phase, be pressure-relieved by step T2 (Da 1) to the higher intermediate level $P_4$ during which the gas discharged from adsorber A whose valve 15 has opened (while valve 50 is closed) arrives for top/top pressure compensation via choke 73 in line 5, with open valve 35, at adsorber C which, in turn, is now subjected to step T7 whereby it is boosted from intermediate pressure $P_3$ to a higher intermediate level $P_4$. According to the valve circuit diagram on FIG. 4 such pressure compensation (Da 1) takes the time step Z1 which in our example lasts for 55 s, with an overall cycle of 720 s.

Upon the aforesaid first pressure compensation and rest position (standby) which latter, for an overall cycle of 720 s, accounts for 115 s, adsorber A is further relieved by step T3 (Da 2) via another pressure compensation with adsorber D, i.e. brought down from the higher intermediate level $P_4$ to the lower intermediate level $P_3$. To this end gas from absorber A is led, with valves 14 and 42 opened, via a ring line 3 (valve 60 in line 92 closed) and via choke 74, to adsorber D which latter, in turn, is being subjected to step T6 and boosted from its final vacuum pressure $P_1$ to the intermediate level $P_3$. The pressure compensation in our case happens therefore in a top/bottom mode. According to the valve circuit diagram in FIG. 4, the pressure compensation Da 2 lasts for the time span Z3 which in the quoted example takes 10 s of an overall cycle of 720 s.

Hereafter the pressure prevailing in adsorber A is further reduced by step T4 (GEE) in a counter-flow, with opened valves 12 and 60, via choke 75, from the intermediate level $P_3$ down to ambient pressure $P_2$. The gas discharged during this enters a waste gas line 92. In our example said, the counter-flow pressure relief lasts 55 s on a total cycle of 720 s.

Upon counter-flow pressure relief adsorber A will be evacuated by step T5 (Ev), with opened valve 11, by means of vacuum pump 80, from ambient pressure $P_2$ until having arrived at a final vacuum pressure $P_1$ which may be 50 mbar. The gas mixture low in helium withdrawn during evacuation enters waste gas line 93. In our example evacuation takes 115 s on an overall cycle of 720 s.

Thereafter the evacuated adsorber A is, by step T6 (DA 1), brought from its final vacuum pressure $P_1$ to intermediate pressure $P_3$ in a compensation with adsorber B. The step is effected preferably as top/bottom pressure compensation. During this step, a helium-enriched gas mixture is pressure-relieved by passing from the outlet of adsorber B, with the valves 24 and 12 open (valve 60 being closed), via ring line 3 and choke 74 to the inlet of adsorber A. All the while adsorber B passes through step T3. During pressure compensation the pressure in adsorber B drops from an intermediate level $P_4$ to the lower intermediate level $P_3$. Pressure compensation DA 1 takes 10 s on an overall cycle of 720 s duration.

Adsorber A, now boosted to the intermediate pressure level $P_3$, is hereafter subjected to further pressure build-up by step T7 (DA 2) bringing it to intermediate level $P_4$ in another pressure compensation with adsorber C. This compensation is carried out preferably in the top/top mode so that a helium-enriched gas mixture becomes destressed passing from the outlet of adsorber C with open valves 35 and 15 via choke 73 in line 5, to the outlet of adsorber A. All the while adsorber C is subjected to step T2 whereby pressure in adsorber C drops from adsorption pressure $P_5$ to an intermediate level $P_4$. Pressure compensation DA 2 takes 55 s on an entire cycle of 720 s duration.

Finally adsorber A is boosted by step T8 (DA 3) using product gas to bring it from the intermediate level $P_4$ to adsorption pressure $P_5$. To this end, part of the product gas is passed to adsorber A via choke 72 and open valves 50 and 15. According to the valve circuit diagram on FIG. 4 pressure build-up DA 3 is composed of the 2 time steps Z2 and Z3 taking 115 viz. 10 s on an overall cycle of 720 s.

Upon pressure build-up DA 3 using product gas another pressure swing cycle starts in adsorber A, commencing again by the adsorption step. The pressure swing cycle in the adsorbers B, C and D runs accordingly, although staggered in time, as can be taken from FIG. 3. Respective valve arrangements 20, 21, 22, 23, 30, 31, 32, 33, 34, 40, 41, 43, 44 and 45 for adsorbers B, C and D operate in similar sequence to those associated with adsorber A as hereinabove described and illustrated in FIG. 4.

As was described earlier, regeneration of the adsorbent is brought about by an evacuation step although with the present state of the art the gas constituents, such as nitrogen and methane, to be removed from the helium-containing feedgas could be gotten rid of by product gas flushing. Such flushing desorption would, however, lead to unacceptably high helium yield losses in the case of helium recovery from natural gases since given the low helium content in the feedgas the product gas yield in the form of high purity helium gas is modest, with big gas volumes having to be desorbed at the same time, the gas constituents having to be removed by adsorption and re-desorbed again account for at least 90% by vol. of the feed gas.

EXAMPLES

In a pressure swing plant on a laboratory scale, according to FIG. 1 (however excluding the prefilters F1 through F4), applying an adsorption pressure of 20 bar, a final vacuum pressure of 50 mbar and an overall cycle duration of 720 s corresponding to 5 cycles/h, separation experiments were carried out using a gas mixture containing helium (about 5% by vol.), methane (about 29% by vol.) and nitrogen (about 66% by vol.). The four adsorbers A through D were filled with carbon molecular sieve of an average adsorptive pore diameter of 0.35 nm; their filling capacity amounted to 2 l/adsorber. During the experiments the volume of product gas was adjusted by setting of the needle valve 71 whereby the degree of helium purity in the product gas was varied at the same time. The test results summarized in tables 1 through 4 below support the doctrine of the invention that helium can, indeed, be enriched to a helium purity between 75 and 95% by vol. in the product gas, starting from a feedgas containing <10% by vol. helium, with, depending on the helium purity in the product gas, a helium yield between 90–99.9% being attained. The experimental results are laid down in the form of a complete mass balance.

TABLE 1

|  | Concentration (% by vol.) | | | Volume |
|---|---|---|---|---|
|  | He | CH$_4$ | N$_2$ | (Nl/h) |
| Feedgas | 5,1 | 28,9 | 66,0 | 602,2 |
| Evacuation waste gas | 0,7 | 23,1 | 76,2 | 191,3 |
| Waste gas from counter-flow relief | 0,5 | 34,0 | 65,5 | 381,7 |
| Product gas | 95,0 | — | 5,0 | 29, |

From the above can be computed a helium yield of 90.3%.

TABLE 2

| | Concentration (% by vol.) | | | Volume |
|---|---|---|---|---|
| | He | CH$_4$ | N$_2$ | (Nl/h) |
| Feedgas | 5,3 | 28,9 | 65,8 | 593,6 |
| Evacuation waste gas | 0,2 | 23,8 | 76,0 | 188,5 |
| Waste gas from counter-flow relief | 0,2 | 34,1 | 65,7 | 371,5 |
| Product gas (crude helium) | 90,0 | — | 10,0 | 33,6 |

From the above can be computed a helium yield of 96,1%.

TABLE 3

| | Concentration (% by vol.) | | | Volume |
|---|---|---|---|---|
| | He | CH$_4$ | N$_2$ | (Nl/h) |
| Feedgas | 5,1 | 28,6 | 66,3 | 604,1 |
| Evacuation waste gas | — | 24,5 | 75,5 | 190,4 |
| Waste gas from counter-flow relief | <0,1 | 33,7 | 66,2 | 375,2 |
| Product gas (crude helium) | 80,0 | — | 20,0 | 38,5 |

From the above can be computed a helium yield of 99.9%.

TABLE 4

| | Concentration (% by vol.) | | | Volume |
|---|---|---|---|---|
| | He | CH$_4$ | N$_2$ | (Nl/h) |
| Feedgas | 5,4 | 28,5 | 66,1 | 609,4 |
| Evacuation waste gas | — | 26,0 | 74,0 | 194,1 |
| Waste gas from counter-flow relief | <0,1 | 33,1 | 66,8 | 372,4 |
| Product gas (crude helium) | 76,4 | — | 23,6 | 42,9 |

From the above can be computed a helium yield of 99.6%.

Figure 5:
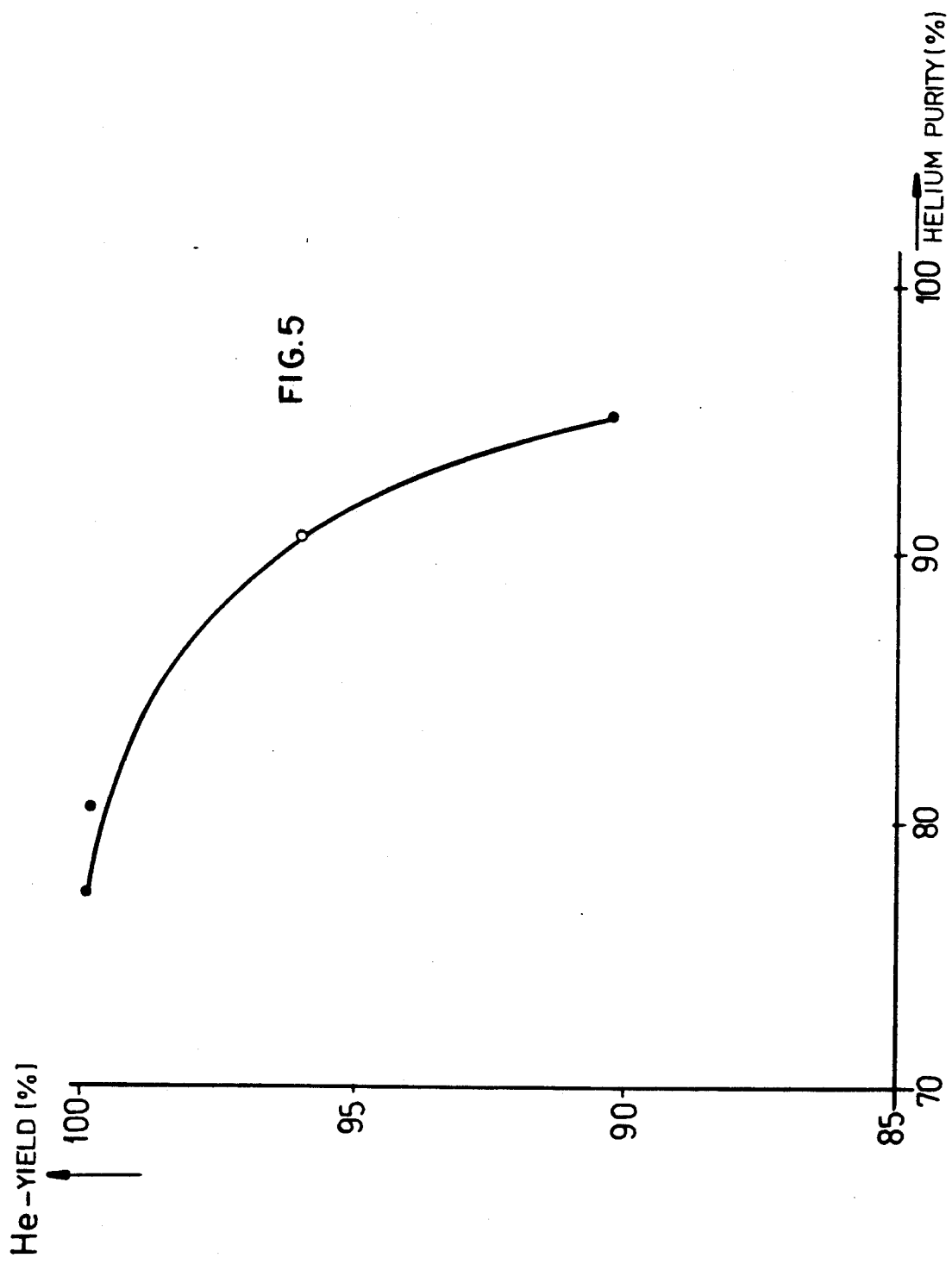
FIG. 5 is a diagram showing the dependency of helium yield on the helium purity in a plant (see FIG. 1).

With increasing helium purity, (helium content of the recovered crude helium) the helium yield decreases and vice versa. The interdependence between helium purity (helium content of the recovered crude helium) and the helium yield is represented in FIG. 5.

We claim:

1. Method of helium enrichment, according to a pressure swing adsorption process, from a gas mixture comprising helium, nitrogen and methane, passed through carbon molecular sieves which adsorb nitrogen and methane where the gas mixture is fed cyclically to four adsorber vessels arranged in parallel which successively pass through a pressure build-up, an adsorptive and a pressure relief phase, with pressure build-up and relief being in part brought about by pressure compensation with anyone of the other adsorbers wherein;
   a) the pressure build-up phase comprises the three steps of:
      1. pressure increase from a final vacuum pressure ($P_1$) to a medium pressure ($P_3$);
      2. pressure increase from the medium pressure ($P_3$) to a higher pressure ($P_4$);
      3. pressure increase from the higher level ($P_4$) to a highest pressure level ($P_5$) representing an adsorption pressure;
   b) the pressure relief phase comprises the four steps of:
      1. pressure relief from the highest level ($P_5$) down to the higher level ($P_4$);
      2. pressure relief from the higher level ($P_4$) down to the medium level ($P_3$);
      3. pressure relief from the medium level ($P_3$) down to an ambient pressure ($P_2$);
      4. pressure relief from the ambient pressure ($P_2$) down to the final vacuum pressure ($P_1$);
   c) pressure compensation is brought about in two compensation steps with the first compensation step taking place between an outlet of a second adsorber where the second pressure build-up step (from $P_3$ to $P_4$) happens and with the second compensation step taking place between an outlet of a first adsorber where the second pressure relief step (from $P_4$ down to $P_3$) happens and an inlet of a third adsorber where the first pressure build-up step (from $P_1$ to $P_3$) happens and
   d) the third as well as the fourth pressure relief steps are effected by counter-flow whereby a waste gas low in helium is yielded, whereas the third pressure increase is effected using product gas.

2. The method according to claim 1 wherein the gas mixture further comprises higher hydrocarbons and wherein the adsorbers are preceded by pre-filters filled with activated carbon for removing the higher hydrocarbons from the gas mixture.

3. The method according to claim 1 wherein the highest pressure level ($P_5$) is greater than 1 bar and the final vacuum pressure is below 500 mbar.

4. The method according to claim 3 wherein the highest pressure level ($P_5$) is between 10 and 30 bar and the final vacuum pressure is 50 mbar.

5. The method according to claim 3 wherein pressures are as follows:
   $P_1 = 50$ mbar
   $P_2 = 1$ bar
   $P_3 = 4$ bar
   $P_4 = 11.7$ bar
   $P_5 = 20$ bar.

6. The method according to claim 1 wherein an entire operational cycle lasts between 415 and 3600 s.

7. The method according to claim 1 wherein an entire operational cycle lasts 720 s.

8. The method according to claim 1 wherein the pressure relief phase in an operational cycle lasting 720 s comprises the following time intervals:

| | |
|---|---|
| 1. Pressure relief step from $P_5$ down to $P_4$ | 55 s |
| Rest position | 115 s |
| 2. Pressure relief step from $P_4$ down to $P_3$ | 10 s |
| 3. Pressure relief step from $P_3$ down to $P_2$ | 55 s |
| 2. Pressure relief step from $P_2$ down to $P_1$ | 115 s. |

9. The method according to claim 1 wherein the pressure build-up phase in an operational cycle lasting 720 s comprises the following time intervals:

| | |
|---|---|
| 1. Pressure build-up step from $P_1$ to $P_3$ | 10 s |
| 2. Pressure build-up step from $P_3$ to $P_4$ | 55 s |
| 3. Pressure build-up step from $P_4$ to $P_5$ | 125 s. |

10. The method according to claim 1 wherein recovery of the product gas extends over a time interval of 180 s in an operational cycle lasting 720 s.

11. The method according to claim 1 wherein the helium proportion in the gas mixture amounts to 10% by volume or less.

12. The method according to claim 1 wherein the helium proportion in the gas mixture amounts to between 2 and 8% by volume.

13. The method according to claim 1 wherein natural gas is employed as the gas mixture.

* * * * *